(No Model.)
L. W. RUPP.
DRILL.
No. 419,563. Patented Jan. 14, 1890.
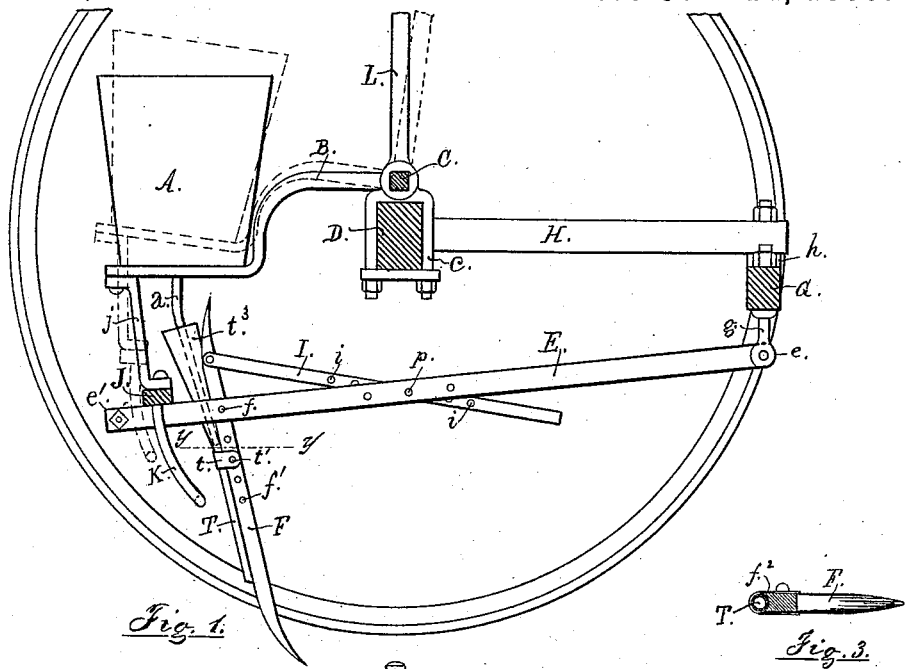
Fig. 1.
Fig. 3.
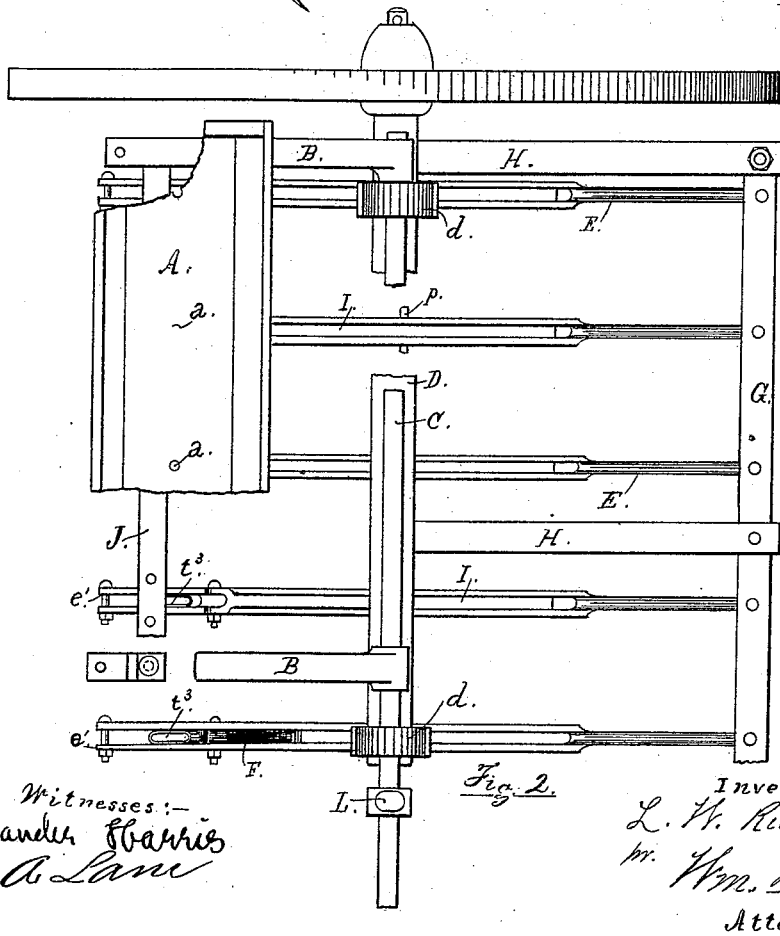
Fig. 2.
Witnesses:—
Alexander Harris
Geo. A. Lane
Inventor
L. W. Rupp
by Wm. R. Gerhart
Attorney

UNITED STATES PATENT OFFICE.

LEMON W. RUPP, OF VOGANSVILLE, PENNSYLVANIA.

DRILL.

SPECIFICATION forming part of Letters Patent No. 419,563, dated January 14, 1890.

Application filed April 22, 1887. Serial No. 235,750. (No model.)

*To all whom it may concern:*

Be it known that I, LEMON W. RUPP, a citizen of the United States, residing at Vogansville, in the county of Lancaster and State of Pennsylvania, have invented certain Improvements in Drills, of which the following is a specification.

This invention relates to improvements in drills for the planting of grass-seed, constructed to be used as cultivators for the smaller grains sown by drills.

The object, more particularly, of this invention is to open a furrow so shallow and narrow that the seed may not be buried too deeply and yet be covered by the infalling of the soil as the tine passing along opens the earth and the seed is deposited; to prevent any one drill from being thrown upward by lumps of earth or other yielding obstructions, and yet to permit the dropping of the same to continue the line of sown seed through slight depressions of the ground which may be passed over.

The object is, further, to provide a shovel or tine of such dimensions and construction as to form a suitable blade for the cultivation of wheat and small cereals of like character.

These objects I accomplish by the mechanism illustrated in the accompanying drawings, in which—

Figure 1 is a vertical longitudinal section; Fig. 2, a top or plan view of a portion of my drill, and Fig. 3 a horizontal section through the tine on the line $y\,y$.

Similar letters refer to similar parts throughout the several views.

A represents the seed-box, supported by the rearwardly-projecting brackets B, having one end rigidly attached to the rotating rod C. The rod C runs along the top of the axle D, is journaled thereon in boxes $d$, and is provided with a hand-lever L, by which it is rotated in the said boxes. These boxes are engaged with the axle by clips $c$. The beams E, to which the drill teeth or tines F are attached, are secured to the under side of the cross-beam G, supported by and beneath the forwardly-projecting arms H, framed into the front face of the axle. In order to properly depress the front end $e$ of the beams E, there are filling-blocks $h$ placed between the arms H and the cross-beam G. The connection between the beams E and the beam G is made by pivoting the former vertically to the lower ends of the screw-bolts $g$, passing upward through the beam. Each beam E has a longitudinal vertical slot extending from the rear end $e'$ forward toward the front, in which the tines F are secured. These tines are narrow and curved forward to a point at both ends to permit their being reversed as either point dulls or wears out. They are held in the slot by means of pins $f$, passing through holes in the beam and tine. The tine is provided with a series of holes $f'$, to permit it to be vertically adjusted, and is held at the required angle by a diagonal arm I, pivoted to it near the upper end, and is extended forward and downward through the aforesaid slot and secured therein by a pin $p$. As will be seen, the strain of the arm I occasioned by the tendency of the tine to change the angle at which it sets in the groove of the beam E exerts a shearing force upon the said pin. This pin is made of wood or other similar material of sufficient strength to resist the strain intended to be borne by the tine in performing its legitimate work, but is too weak to hold the arm I in case the tine encounters a rock rigidly embedded in the ground or other obstacle its resistance to which would tend to break it. The arm I is rendered adjustable by means of a series of holes $i$, as shown. The tine has a vertical groove $f^2$ extending throughout the straight portion of its rear edge, serving as a rest for the dropping-tube T, which extends from near the top of the tine downward sufficiently near the ground to deposit the seed in the furrow made by the tine before the said furrow is filled by the infalling earth. It is secured to the tine by a pair of ears $t$, which embrace the tine, and a pin $t'$, passing through holes in said ears and the tine. The tube is rendered adjustable vertically in order that it may be moved to maintain its proper position with reference to the lower end of the tine as the same is worn off by means of a series of holes through the tine.

Seed is fed into the tube T from the seed-box A through a small flexible tube $a$, the wabbling of the lower end of which in the funnel-head $t^3$ of the said tube T facilitates the passage of the seed downward.

Extending across the rear ends of the beam E back of the dropping-tubes is a bearing-beam J, rigidly connected with the seed-box by hangers $j$, and having a dependent staple K fixed therein at each beam E, which embraces said beam and extends downward some distance below it. This beam J prevents any one of the tines from being thrown upward upon encountering slight obstructions, keeping it down to its place in the ground. The tines are raised when the drill is transported from field to field by means of the hand-lever L, which raises the seed-box at the same time. The bearing-beam J rises a short distance before the beams E are lifted by the staples K, they being made of some depth to allow for the dropping of one or more tines in passing over slight depressions in the ground to preserve the continuity of the rows of seed planted.

Having thus described my invention, what I claim as new, and desire to secure by Letters Patent, is—

1. The combination, with the seed-box supported back of the axle by brackets B, extending therefrom, of forwardly-projecting arms H, secured to the axle, a cross-beam G, supported by the front ends of the arms H, tine-supporting beams E, pivoted beneath the beam G and extending rearwardly beneath the seed-box, tines upheld by the beams E, dropping-tubes secured to the tines, and the feed-tube $a$, all arranged and constructed substantially as and for the purpose specified.

2. In a seed-drill, the combination, with the rotating rod C, journaled to the axle, of the seed-box A, supported back of the axle by brackets B, rigidly attached to the said rod C, substantially as and for the purpose specified.

3. The combination, with the seed-box supported back of the axle by brackets B, extending therefrom, of tine-supporting beams E, pivoted to the front of the frame, tines upheld by the beams E, and a bearing-beam J, rigidly connected with the seed-box and resting upon the beams E, substantially as and for the purpose specified.

4. The combination, with the rotating rod C, journaled to the axle, and the seed-box supported behind the said axle by brackets rigidly attached to the rod C, of tine-supporting beams E, pivoted to the front of the frame, tines upheld by the beams E, a bearing-beam J, connected with the seed-box, and dependent staples K, fixed therein at each beam E, which embrace said beams E and extend downward some distance below the same when the bearing-beam rests on the beams E, all constructed and operating substantially as and for the purpose specified.

L. W. RUPP.

Witnesses:
F. W. HULL,
L. LEWIS.